(12) United States Patent
Belschner

(10) Patent No.: US 9,578,814 B2
(45) Date of Patent: Feb. 28, 2017

(54) CHRISTMAS TREE BAG

(71) Applicant: Jay Michael Belschner, Sarver, PA (US)

(72) Inventor: Jay Michael Belschner, Sarver, PA (US)

( * ) Notice: Subject to any disclaimer, the term of this patent is extended or adjusted under 35 U.S.C. 154(b) by 0 days.

(21) Appl. No.: 14/703,978

(22) Filed: May 5, 2015

(65) Prior Publication Data

US 2016/0324079 A1 Nov. 10, 2016

(51) Int. Cl.
*B65D 85/50* (2006.01)
*A01G 13/04* (2006.01)
*A47G 33/04* (2006.01)

(52) U.S. Cl.
CPC ............ *A01G 13/043* (2013.01); *A47G 33/04* (2013.01)

(58) Field of Classification Search
CPC ........ B65D 85/52; A47G 33/04; A01G 13/043
USPC ........ 206/423; 224/309, 318, 324, 328, 329, 224/330, 314, 319
See application file for complete search history.

(56) References Cited

U.S. PATENT DOCUMENTS

| 4,054,166 | A | * | 10/1977 | Burke | A47G 33/045 206/423 |
| 4,592,091 | A | * | 5/1986 | Italici | A45C 13/26 150/107 |
| 5,291,999 | A | * | 3/1994 | Phair | A47G 33/045 206/423 |
| 5,590,775 | A | * | 1/1997 | Moore | A47G 33/045 206/423 |
| 6,244,482 | B1 | * | 6/2001 | Gyarmaty | B60R 9/055 224/318 |
| 6,547,110 | B2 | * | 4/2003 | O'Hare | A45F 3/08 224/155 |
| 8,075,185 | B2 | * | 12/2011 | Hecht | A47G 33/045 280/18 |
| 2004/0262183 | A1 | * | 12/2004 | Gildart | A45C 11/00 206/423 |
| 2007/0227925 | A1 | * | 10/2007 | Westrate | A47G 33/045 206/423 |
| 2008/0257770 | A1 | * | 10/2008 | Limber | B62B 1/26 206/423 |

* cited by examiner

*Primary Examiner* — J. Gregory Pickett
*Assistant Examiner* — Jenine Pagan
(74) *Attorney, Agent, or Firm* — David G. Oberdick

(57) ABSTRACT

A Christmas tree bag is an apparatus which allows a user to easily carry and transport a Christmas tree and the like on a vehicle roof top while providing protection to a vehicles surface. The apparatus is comprised of a rectangular tarp like configuration that allows the user to enclose a Christmas tree within the tarp. The Christmas tree is placed on the tarp and the side edges are then brought together around the tree. The tree bag is secured around the Christmas tree with the attached straps. The outer surface includes a hand strap affixed for ease of carrying. The Christmas tree bag is then placed on a vehicle roof top and secured.

9 Claims, 6 Drawing Sheets

CHRISTMAS TREE BAG

CROSS-REFERENCE TO RELATED APPLICATIONS

Provisional utility application No. 61/996,514. Filing date May 10, 2014

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to a bag for a Christmas tree and the like securing it to the top of a vehicle. The tree bag is designed to provide protection to a vehicles surface when transporting a Christmas tree and the like as well as to provide ease to the handler.

The use of Christmas tree bags is known in the prior art as Christmas tree bags heretofore were utilized for the purpose of storing a Christmas tree and/or covering Christmas trees to collect the fallen needles while simultaneously acting as a tree skirt as well as being devised for transporting the Christmas tree by means of a transport system on wheels to pull it behind a person or to transport by means of a satchel to carry over ones shoulder.

Christmas trees and the like are commonly heavy, bulky and are prone to shed needles and secretions from the tree. These properties are likely to make it cumbersome for the person transporting the tree as well as likely to cause damage to a vehicle roof top.

By way of example, the prior art disclosed in U.S. Pat. No. 8,075,185 B2 to Hecht an original Christmas tree transport system.

U.S. Pat. No. 5,590,775 to Carter discloses a Christmas tree transport and storage satchel.

U.S. Pat. No. 5,291,999 to Phair discloses a Christmas tree bag.

U.S. Pat. No. 4,799,520 to Blackburn discloses a cover for a Christmas tree.

U.S. Pat. No. 3,872,906 to Bolanz discloses a Christmas tree cover.

SUMMARY

Transporting a Christmas tree and the like can be difficult and cumbersome. It is found that Christmas trees and the like are often dragged to a vehicle and then placed directly against a vehicles roof top. The Christmas tree bag remarkably differs from the prior art by providing an apparatus primarily developed for the purpose of securing a Christmas tree to a vehicle for vehicular transport while providing coverage to the Christmas tree to protect a vehicles surface. Therefore, it can be appreciated that there exists a continuing need for a new Christmas tree bag for transporting on a vehicle. In this regard, the present invention is an apparatus that substantially fulfills this need.

DETAILED DESCRIPTION OF THE INVENTION

Figure 1:
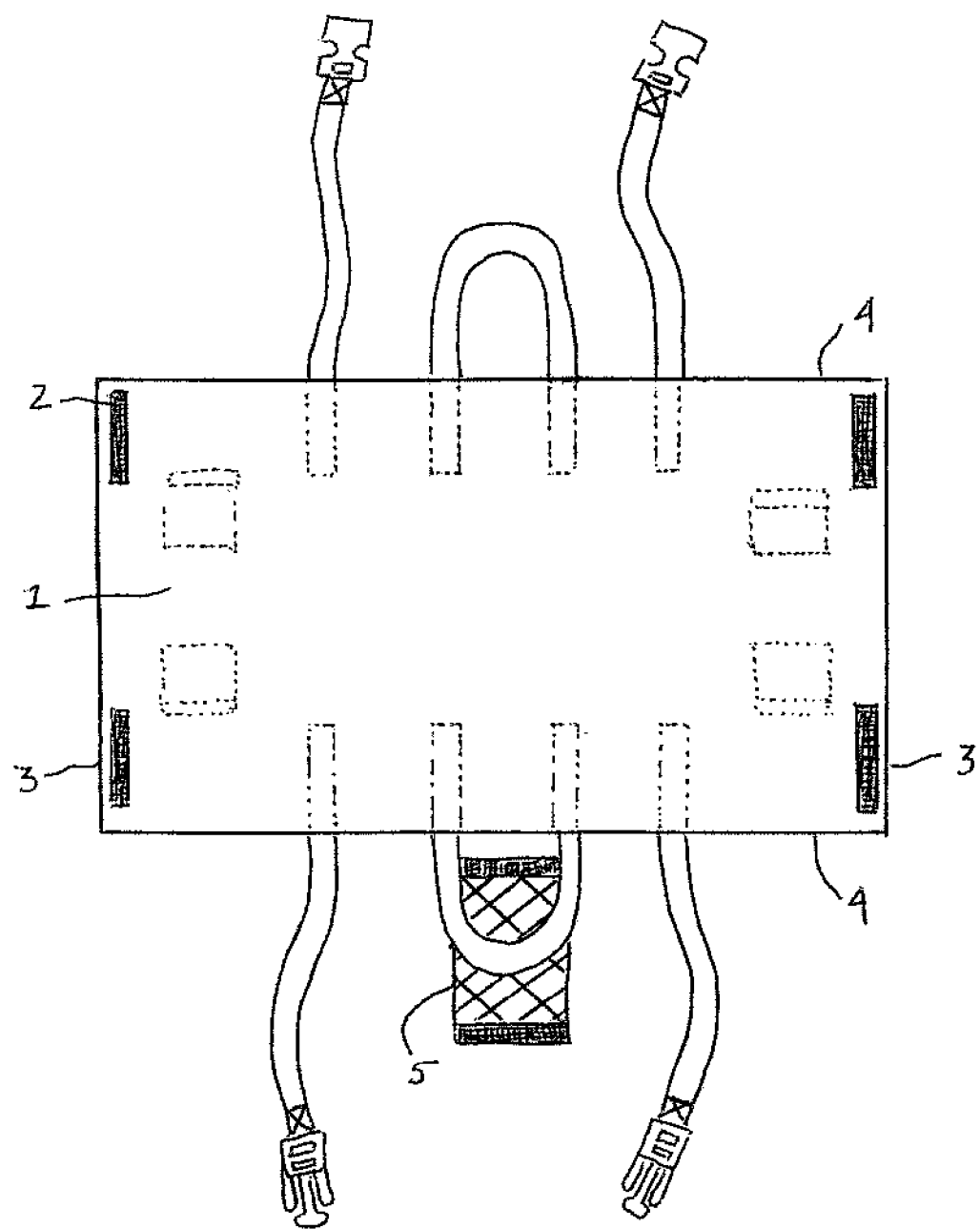
FIG. 1 is a top view of the Christmas tree bag.
Figure 2:
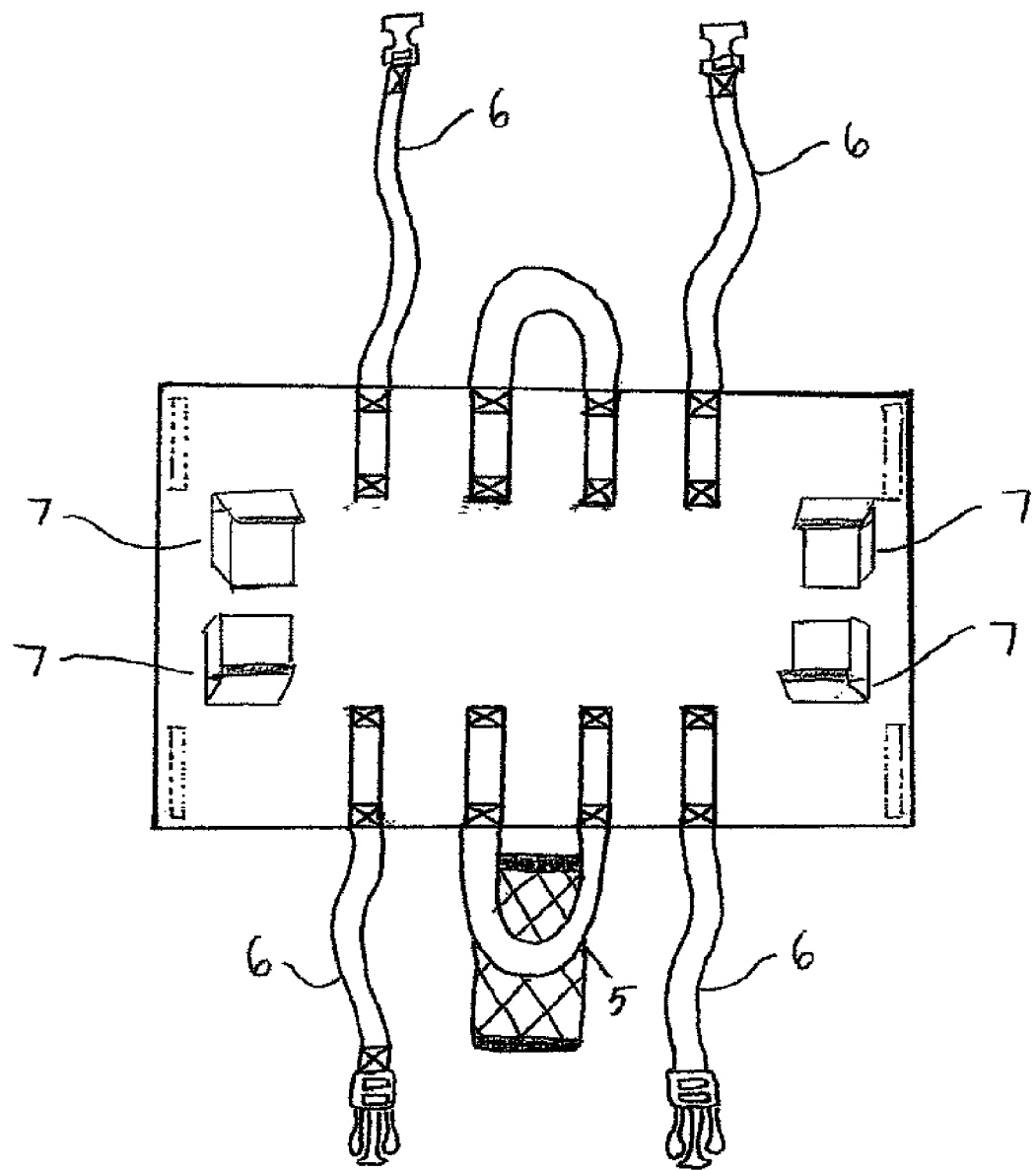
FIG. 2 is a bottom view of the Christmas tree bag also showing the padded VELCRO handle.
Figure 3:
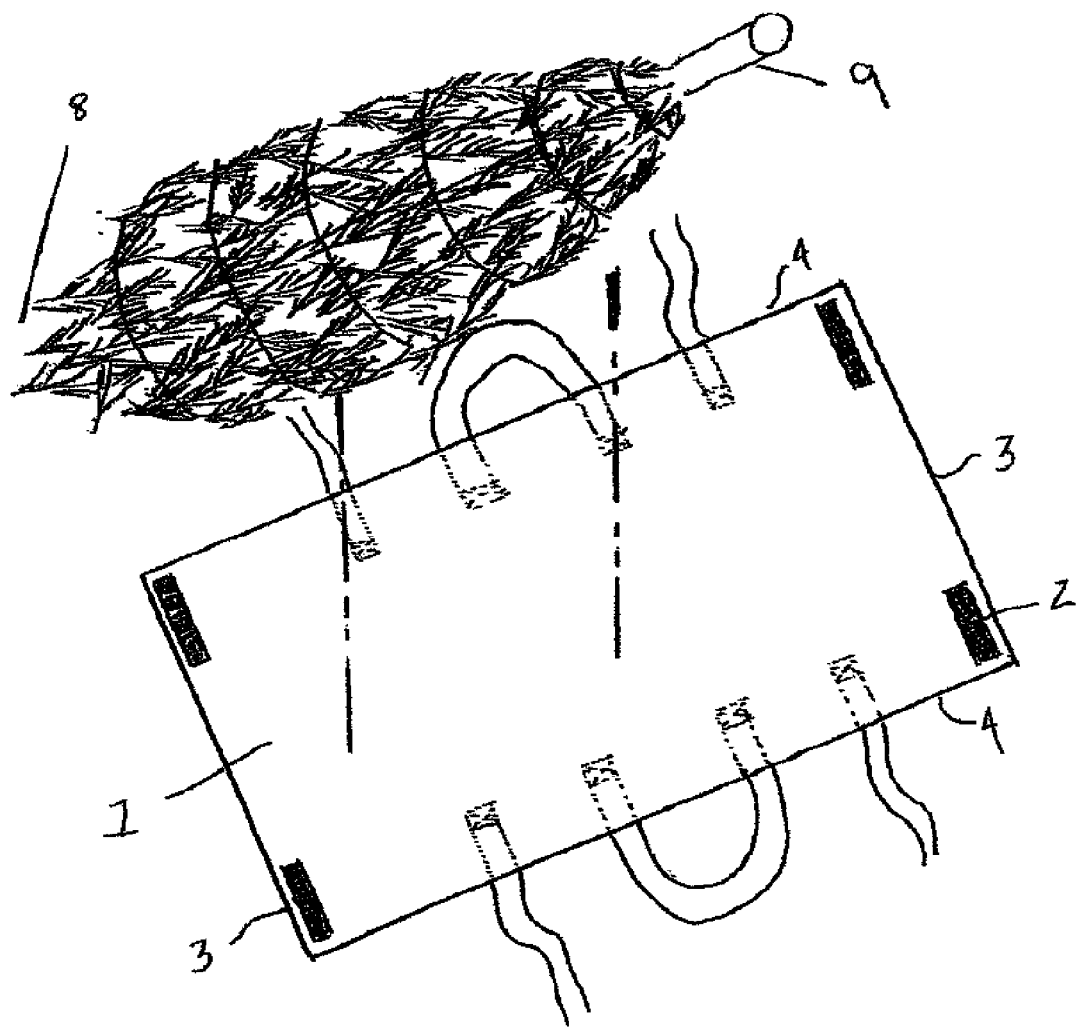
FIG. 3 is an illustration view of how the Christmas tree is placed in the tree bag.
Figure 4:
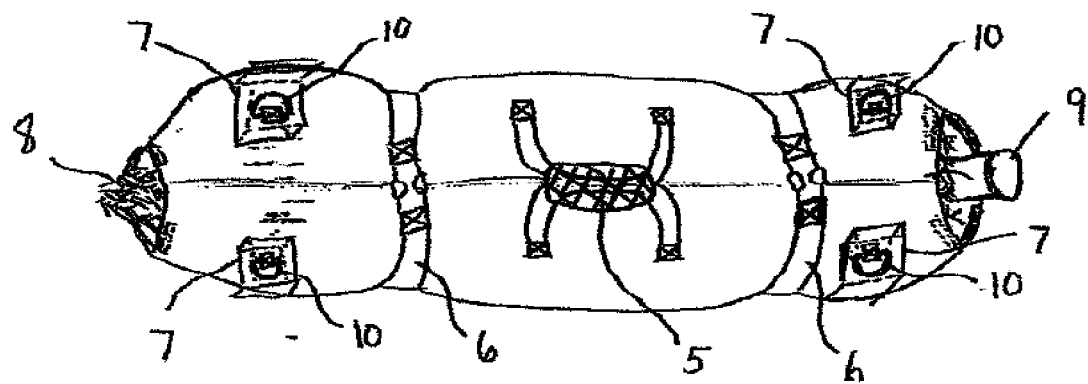
FIG. 4 is an illustration view of the top of the Christmas tree bag to show a tree secured inside it with each side edges together with the side release cinch straps fastened together.
Figure 5:
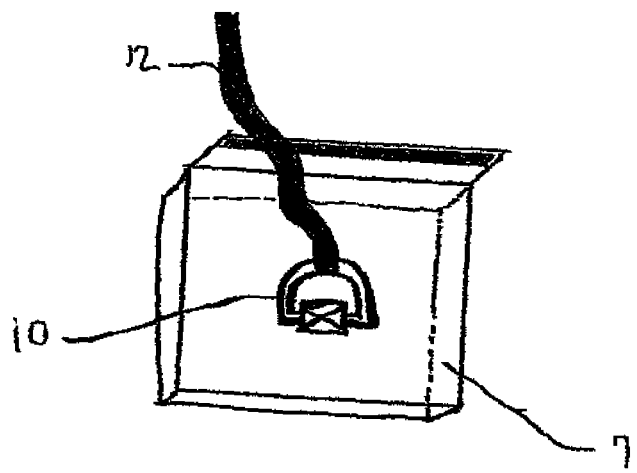
FIG. 5 is an illustration of one of the four attached D-rings encompassed in a pocket that is utilized to attach and secure the Christmas tree bag to the roof of a vehicle.
Figure 6:
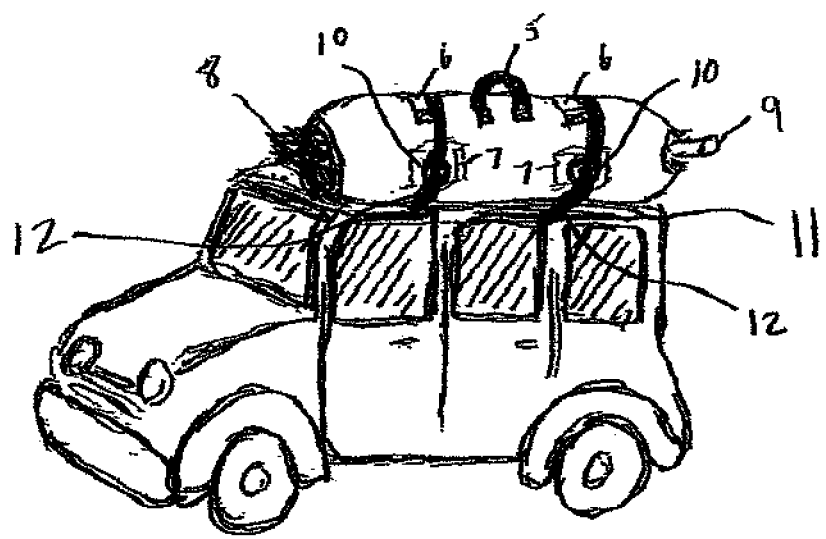
FIG. 6 is an illustration of the Christmas tree bag in use and secured to the roof of a vehicle.

The present invention is a Christmas tree bag (1) comprised of a rectangular tarp configuration fabricated of nylon, polyethylene, polypropylene, vinyl or other fabric material. The present invention is to provide a bag that is durable, washable and reusable as well as a version of the bag that is comprised of a material that is disposable after one use. It has two side edges (4) with each side containing two attached fasteners (6), an upper extent (3) and a lower extent (3) which is diverse for placement of tip of tree (8) or stump of tree (9) to be placed at either end with hook and loop or VELCRO fasteners (2) at each extent (3) with a central region there between for Christmas tree placement. To utilize it, the Christmas tree is placed on the tarp—side edges (4) are then brought together around the tree. To secure the tree bag around the Christmas tree there are two fasteners cinch straps (6) on each side that couple together. Around the circumference the side fasteners (6) enable users to adjust the tightness around the tree based on the tapperness of the Christmas tree. Fasteners (6) can consist of release buckle cinch straps, cinch straps, cam straps, or ratchet straps. The fasteners can be sewn to the outer surface of the bag. The hook and loop or VELCRO fasteners (2) at the upper and lower extents fasten together to increase the security of the tree as well as to limit tree needles, branches and exude from falling out of, onto, or coming in contact with a vehicles surface. The outer surface of the tarp includes a centrally located affixed hand strap (5) located toward each side edge that come together and fasten with the hook and loop or VELCRO fasteners to complete the handle. The hand strap (5) is fabricated with the options of a non-padded or padded material handle. Hand strap (5) can also be comprised of webbing. Positioned on bilateral sides are two securely sewn on D-rings (10) utilized to secure the tree bag to a roof of a vehicle (11) with or without a luggage rack by attaching a strap, rope, or cord (12) to the D-ring (10). Each D-ring (10) are encompassed in a pocket (7) that is sewn into the outer surface of the bag to store the vehicle attachment strap, rope or cordage (12). Alternatively, fastened webbing can be used in place of the D-ring (10).

LEGEND OF REFERENCE NUMBERS

1. Christmas tree bag
2. Lower and upper extent hook and loop or VELCRO fasteners
3. Upper/lower extents
4. Side edges 5. Padded hook and loop or VELCRO fastener handle
6. Side fasteners
7. Pocket that contains strap, rope or cord attached to a D-ring inside the pocket
8. Christmas tree point
9. Christmas tree stump
10. D-ring
11. Vehicle roof top
12. Strap, rope, cordage

The invention claimed is:

1. A new and improved Christmas tree bag for vehicular transport and vehicle protection comprising:
 (a) a rectangular tarp configuration material wherein the Christmas tree is placed on and then the said material encompasses the Christmas tree;
 (b) said material having two bilateral sides, two side edges, and an upper extent and a lower extent, wherein the upper and lower extents form openings when the side edges are folded over the Christmas tree;
 (c) said material having an inner and outer surface;
 (d) at least one pair of opposing side fasteners, with each member of the pair of opposing side fasteners affixed to the outer surface on opposing bilateral sides of the Christmas tree bag, such that when the side edges are folded over the Christmas tree, the at least one pair of side fasteners fasten to each other to assist the tarp material in encompassing and stabilizing the Christmas tree, and wherein the at least on pair of side fasteners are adjustable for securing the Christmas tree inside the tarp material and tightening the tarp material around the tapered shape of the Christmas tree;
 (e) said upper and lower extents having hook and loop fasteners that fasten together to assist in stabilizing and securing the tarp material around the smaller circumferences of the top and bottom of the Christmas tree inside the tarp material and limiting tree needles, branches and exude from falling out of the tarp material when folded over and around the Christmas tree;
 (f) said material having hand straps affixed to each bilateral side of the said outer surface and centrally located toward each said side edge wherein the hand straps come together when the side edges of the tarp material are folded over the Christmas tree and join to form a handle;
 (g) at least two connecting points attached to the outer surface on each bilateral side of the tarp material to enable users to attach the said Christmas tree bag to a vehicles roof top; and
 (h) pockets attached to the outer surface of the tarp material and that encompass and shields each connecting point, and wherein each pocket is an area of containment for each connecting point and attachment strap, rope or cordage utilized to secure the Christmas tree bag to a vehicle.

2. The Christmas tree bag as recited in claim 1, wherein the material is fabricated of nylon, polyethylene, polypropylene, or vinyl.

3. The Christmas tree bag as recited in claim 1, wherein the material is washable and reusable.

4. The Christmas tree bag as recited in claim 1, wherein the material is disposable after a single use.

5. The Christmas tree bag as recited in claim 1, wherein the hand straps are webbing.

6. The Christmas tree bag as recited in claim 1, wherein the hand straps are padded and fastened together with hook and loop fasteners.

7. The Christmas tree bag as recited in claim 1, wherein the hand strap is a carrying strap.

8. The Christmas tree bag as recited in claim 1, wherein the connecting point is a fastened D-ring.

9. The Christmas tree bag as recited in claim 1, wherein the connecting point is fastened webbing.

* * * * *